(12) United States Patent
Candelore

(10) Patent No.: US 12,190,015 B2
(45) Date of Patent: Jan. 7, 2025

(54) COGNITIVE AID FOR AUDIO BOOKS

(71) Applicant: Sony Group Corporation, Tokyo (JP)

(72) Inventor: Brant Candelore, Poway, CA (US)

(73) Assignee: Sony Group Corporation, Tokyo (JP)

( * ) Notice: Subject to any disclaimer, the term of this patent is extended or adjusted under 35 U.S.C. 154(b) by 4 days.

(21) Appl. No.: 18/169,429

(22) Filed: Feb. 15, 2023

(65) Prior Publication Data
US 2024/0272867 A1   Aug. 15, 2024

(51) Int. Cl.
*G06F 3/16* (2006.01)
*G06F 16/68* (2019.01)
*G10L 15/18* (2013.01)
*G10L 15/22* (2006.01)

(52) U.S. Cl.
CPC .............. *G06F 3/165* (2013.01); *G06F 3/167* (2013.01); *G06F 16/686* (2019.01); *G10L 15/1815* (2013.01); *G10L 15/22* (2013.01); *G10L 2015/223* (2013.01)

(58) Field of Classification Search
CPC ........ G06F 3/165; G06F 3/167; G06F 16/686; G10L 15/1815; G10L 15/22; G10L 2015/223
See application file for complete search history.

(56) References Cited

U.S. PATENT DOCUMENTS

| | | | |
|---|---|---|---|
| 8,548,618 B1* | 10/2013 | Story, Jr. .............. | H04N 21/439 |
| | | | 700/94 |
| 2014/0258858 A1* | 9/2014 | Hwang .................. | G09B 5/062 |
| | | | 715/716 |
| 2017/0280208 A1* | 9/2017 | Mishra .................... | G06F 18/29 |
| 2017/0316085 A1* | 11/2017 | Gupta .................... | G06F 16/243 |
| 2019/0204998 A1* | 7/2019 | Hartrell .................. | G10L 15/26 |
| 2020/0159767 A1* | 5/2020 | Durairaj ................. | G06F 16/638 |
| 2022/0050585 A1* | 2/2022 | Fettes ..................... | G06F 3/165 |
| 2022/0358168 A1* | 11/2022 | Robert Jose ...... | G06F 16/90332 |
| 2022/0415104 A1* | 12/2022 | McLachlan ........... | G06F 3/0482 |
| 2023/0049537 A1* | 2/2023 | Raynor ............... | G10L 21/0216 |
| 2023/0281248 A1* | 9/2023 | Schalkwyk ............ | G06F 40/30 |
| | | | 707/749 |

* cited by examiner

*Primary Examiner* — Tan H Tran
(74) *Attorney, Agent, or Firm* — John L. Rogitz; John M. Rogitz

(57) ABSTRACT

Cognitive aids for various aspects of an audio book may be provided to aid an end-user in following the book's characters and plot and to remind the end-user about prior aspects of the audio book. In some specific examples, the aid may be requested audibly, and the plot data and/or other data may be presented audibly.

14 Claims, 5 Drawing Sheets

COGNITIVE AID FOR AUDIO BOOKS

FIELD

The disclosure below relates to technically inventive, non-routine solutions that are necessarily rooted in computer technology and that produce concrete technical improvements. In particular, the disclosure below relates to cognitive aids for audio books presented via electronic devices.

BACKGROUND

Almost all types of book genres are available in audio format—from detailed historical tomes to intergalactic sagas. As recognized herein, all are read at a constant conversational rate no matter how complicated the background, the plot or the number of characters that must be kept track of. A listener can therefore be overwhelmed with details and can lose track of the storyline. As also recognized herein, audio books in particular provide other challenges as well. For instance, an audio book may be consumed on electronic devices without screens or with small screens. And the listener may be managing the device handsfree while doing other activities such as driving, riding a bicycle, jogging or even just walking. As a result, and as also recognized herein, it is often difficult or impossible for the listener to ascertain certain things about prior portions of the audio book without rewinding aimlessly and inaccurately through the audio book, if rewinding is even possible given the nature of the device on which the audio book is being presented. Even then, it might be difficult to ascertain whatever the user wishes without listening again to the prior portions at length. There are currently no adequate solutions to the foregoing computer-related, technological problem.

SUMMARY

Technologies are provided for allowing a listener of an audio book to audibly access encyclopedic, glossary and plot information up to the current scene or playback position. Yet the technologies provided shall not be a spoiler! This may be done using various types of devices (e.g., mobile phones, tablets, personal computers) and the media player application ("app") itself that is being used for playback. The app knows the current location of the playback and therefore what should be knowable up to that location. It may also be done through the guest operating system (GOS) of the device, based on communication with a cloud server, etc. The app, GOS, or other component may in some specific instances access the metadata locally from local storage as already downloaded or accessed (e.g., through a pointer to specific media) from the cloud if desired.

Accordingly, in one aspect an assembly includes at least one processor configured with instructions to identify an audible request for what might be considered encyclopedic, glossary and plot information pertaining to some but not all of an audio book and, responsive to identification of the audible request, access data associated with the audio book. The instructions are also executable to audibly present the story bibliographic information and plot summary in conformance with the audible request based on accessing the data.

Thus, in some example embodiments the assembly may include one or more speakers and the instructions may be executable to audibly present the encyclopedic, glossary and plot information via the one or more speakers. Also in some example embodiments, the assembly may include one or more microphones and the instructions may be executable to identify the audible request based on input from the one or more microphones.

Additionally, in certain example implementations the instructions may be executable to identify an audible command to pause audible presentation of the audio book and, based on identification of the audible command, process the audible request by accessing the data and audibly presenting the encyclopedic, glossary and plot information in conformance with the audible request. So, for example, the audible command may be identified in a first instance, and the instructions may even be executable to, based on not identifying an audible command to pause audible presentation of the audio book in a second instance, decline to process an audible request for encyclopedic, glossary and plot information at least until an audible command to pause audible presentation of the audio book is received.

Still further, in some example implementations the instructions may be executable to identify a playback position associated with a portion of the audio book that is currently being played out and, based on the playback position, identify the plot summary using the data. The plot summary may summarize one or more events up to the playback position including what the protagonists are currently trying to do, but not events after the playback position, and the data may include different playback positions and associated plot summary elements for different respective portions of the audio book. Likewise, when asking about information about a character, the character can be described and events that have befallen the character can be expounded upon up to the playback position.

Also in some example implementations, the audible request may be a first audible request, the data may be first data, and the instructions may be executable to identify a second audible request, where the second audible request may request an output for an individual from the audio book. Here the instructions may then be executable to access second data associated with the audio book responsive to identification of the second audible request and to audibly present the output for the individual from the audio book in conformance with the audible request based on accessing the second data.

Still further, if desired the audible request may again be a first audible request, the data may be first data, and the instructions may be executable to identify a second audible request, where the second audible request may request an output for an inanimate object from the audio book. Here the instructions may then be executable to access second data associated with the audio book responsive to identification of the second audible request and to audibly present the output for the inanimate object from the audio book in conformance with the audible request based on accessing the second data.

Still further, note that in some specific examples the instructions may be executable to execute natural language understanding to identify a particular element of an overall plot of the audio book as indicated in the audible request, access the data associated with the audio book to identify plot summary data pertaining to the particular element of the overall plot of the audio book, and audibly present the plot summary using the plot summary data based on identification of the plot summary data pertaining to the particular element of the overall plot of the audio book.

Still further, in various example implementations the identification, accessing, and audible presentation steps may be executed by a media player application ("app") being executed to present the audio book.

In another aspect, a method includes identifying a request for an audible output pertaining to a particular aspect of an audio book and, responsive to identification of the request, accessing data associated with the audio book. The method also includes presenting the audible output in conformance with the request based on accessing the data.

In certain examples, the request may be an audible request.

Also in certain examples, the particular aspect may relate to a plot summary pertaining to some but not all of the audio book. So, for example, the method may include identifying a current playback position of the audio book and, based on the playback position, identifying the plot summary using the data. The plot summary may summarize one or more events up to the playback position but not events after the playback position.

If desired, the particular aspect may additionally or alternatively relate to identifying data for an individual from the audio book and/or identifying data for an inanimate object from the audio book.

In still another aspect, an apparatus includes at least one computer storage that is not a transitory signal. The at least one computer storage includes instructions executable by at least one processor to identify a request for an output pertaining to a particular aspect of content for an audio file, access data associated with the audio file responsive to identification of the request, and present the output in conformance with the request based on accessing the data.

Thus, in certain example embodiments the request may be an audible request and the output may be an audible output.

Also in certain example embodiments, the particular aspect may relate to a plot summary pertaining to some but not all of an audio book, where the audio file includes the audio book. Additionally or alternatively, the particular aspect may relate to data related to an individual from the audio book and/or data related to an inanimate object from the audio book.

In yet another aspect, a method includes identifying an audible request for information pertaining to some but not all of an audio book and, responsive to identification of the audible request, accessing data associated with the audio book. The method then includes, based on accessing the data, audibly presenting the information in conformance with the audible request.

Thus, in some examples the method may include audibly presenting the information via one or more speakers and/or identifying the audible request based on input from one or more microphones. Also in certain examples, the method may include identifying an audible command to pause audible presentation of the audio book and, based on identification of the audible command, processing the audible request by accessing the data and audibly presenting story information in conformance with the audible request. The audible command may be identified in a first instance, and the method may include based on not identifying an audible command to pause audible presentation of the audio book in a second instance, declining to process an audible request for story information at least until an audible command to pause audible presentation of the audio book is received.

Still further, if desired the method may include identifying a playback position associated with a portion of the audio book that is currently being played out and, based on the playback position, identifying the relevant information using the data. The plot summary may summarize one or more events up to the playback position but not events after the playback position, and the data may include different playback positions and associated plot summary elements for different respective portions of the audio book.

Additionally, in some cases the audible request may be a first audible request, the data may be first data, and the method may include identifying a second audible request requesting an output for an individual from the audio book and, responsive to identification of the second audible request, accessing second data associated with the audio book. The method may then include based on accessing the second data, audibly presenting the output for the individual from the audio book in conformance with the audible request.

Again in some examples, the audible request may be a first audible request, the data may be first data, and the method may include identifying a second audible request requesting an output for an inanimate object from the audio book and, responsive to identification of the second audible request, accessing second data associated with the audio book. The method may then include based on accessing the second data, audibly presenting the output for the inanimate object from the audio book in conformance with the audible request.

Still further, in some example embodiments the method may include executing natural language understanding to identify a particular element of an overall plot of the audio book as indicated in the audible request, accessing the data associated with the audio book to identify plot summary data pertaining to the particular element of the overall plot of the audio book, and audibly presenting the plot summary using the plot summary data based on identification of the plot summary data pertaining to the particular element of the overall plot of the audio book.

Still further, in some cases the identification, accessing, and audible presentation steps may be executed by a media player application ("app") being executed to present the audio book.

In yet another aspect, a method includes packaging metadata containing information for particular aspects of a story that is part of an audio book that can be downloaded to an audio book application such that the audio book application can be audibly queried to retrieve the information.

In some examples, this method may include providing the audio book over the Internet as a download from a server.

Also in certain examples, only the metadata relevant up to current playback location may be revealed. Additionally, only the query may be done using natural language.

The details of the present application, both as to its structure and operation, can be best understood in reference to the accompanying drawings, in which like reference numerals refer to like parts, and in which:

DETAILED DESCRIPTION

Figure 1:
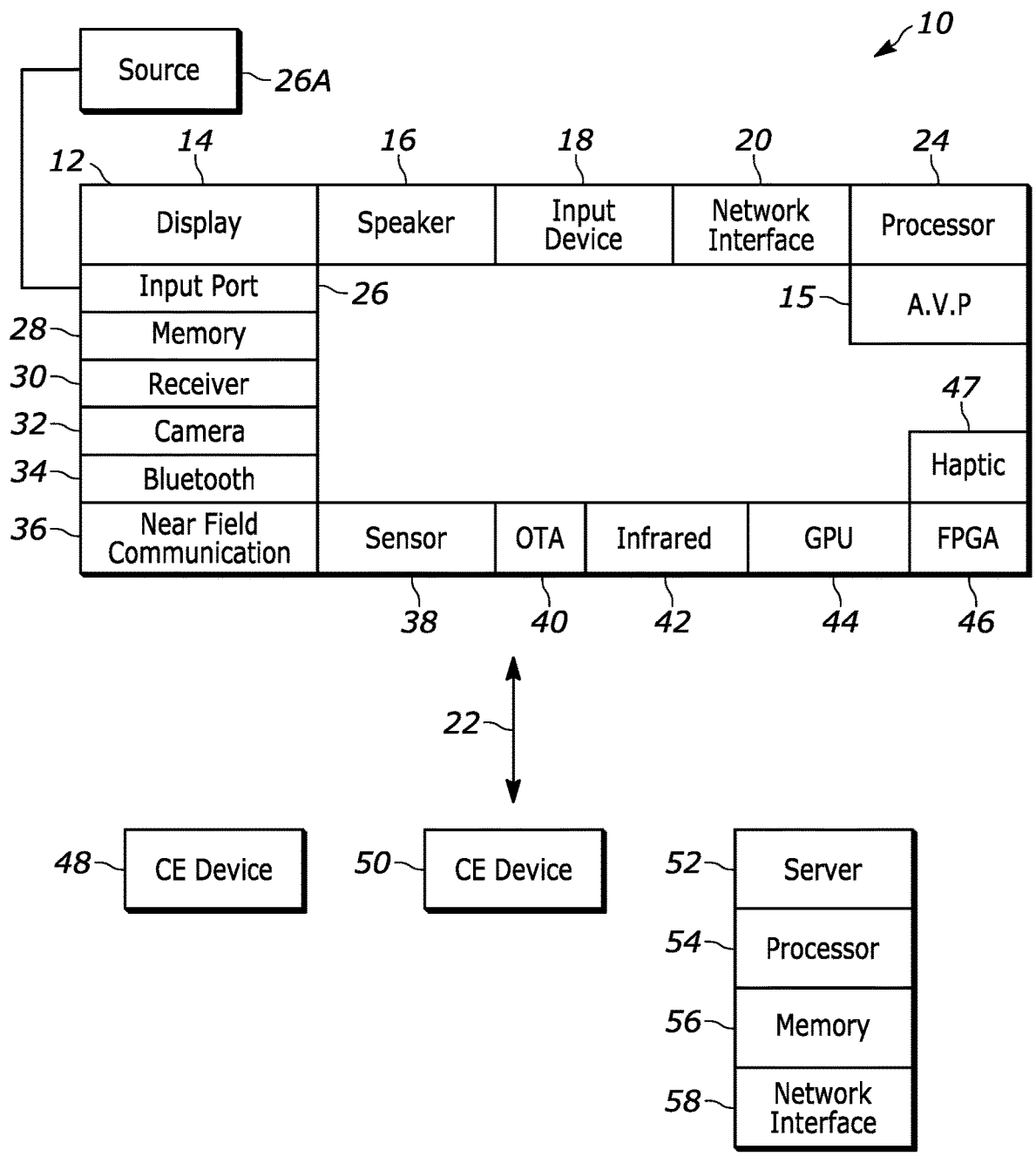
FIG. 1 is a block diagram of an example system in accordance with present principles.

Note that this disclosure relates generally to computer ecosystems including aspects of consumer electronics (CE) device networks such as but not limited to home entertainment networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, display devices such as televisions such as the Sony Bravia TVs (e.g., smart TVs, Internet-enabled TVs), computers such as laptops and tablet computers, standalone speakers, home theater audio/video (AV) devices, and mobile devices including the Sony Xperia mobile phone, smart phones and additional examples discussed below. These client devices may operate with a variety of operating environments. For example, some of the client computers may employ, as examples, Linux operating systems, operating systems from Microsoft, or operating systems from Apple, Inc. or Google. These operating environments and in addition with software drivers and a hardware abstraction layer (HAL) may be used to execute one or more browsing programs, such as a browser made by Microsoft or Google or Mozilla or other Internet networked applications that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box or dongle controlling a TV). The AVD 12 alternatively may also be a computerized Internet enabled ("smart") phone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include an analog audio output port 15 to drive one or more external speakers or headphones, and may include one or more internal speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a smart speaker assembly or other device and may not have a video display. Or, the first CE device 48 may include a computer game console that can be used to send computer game audio and video to the AVD 12 via commands sent directly to the AVD 12 and/or through the below-described server. A second CE device 50 may include similar components as the first CE device 48. In the example shown, the second CE device 50 may be configured as a remote control (RC) for the AVDD 12. Or, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or more devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi or Ethernet transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Figure 2:
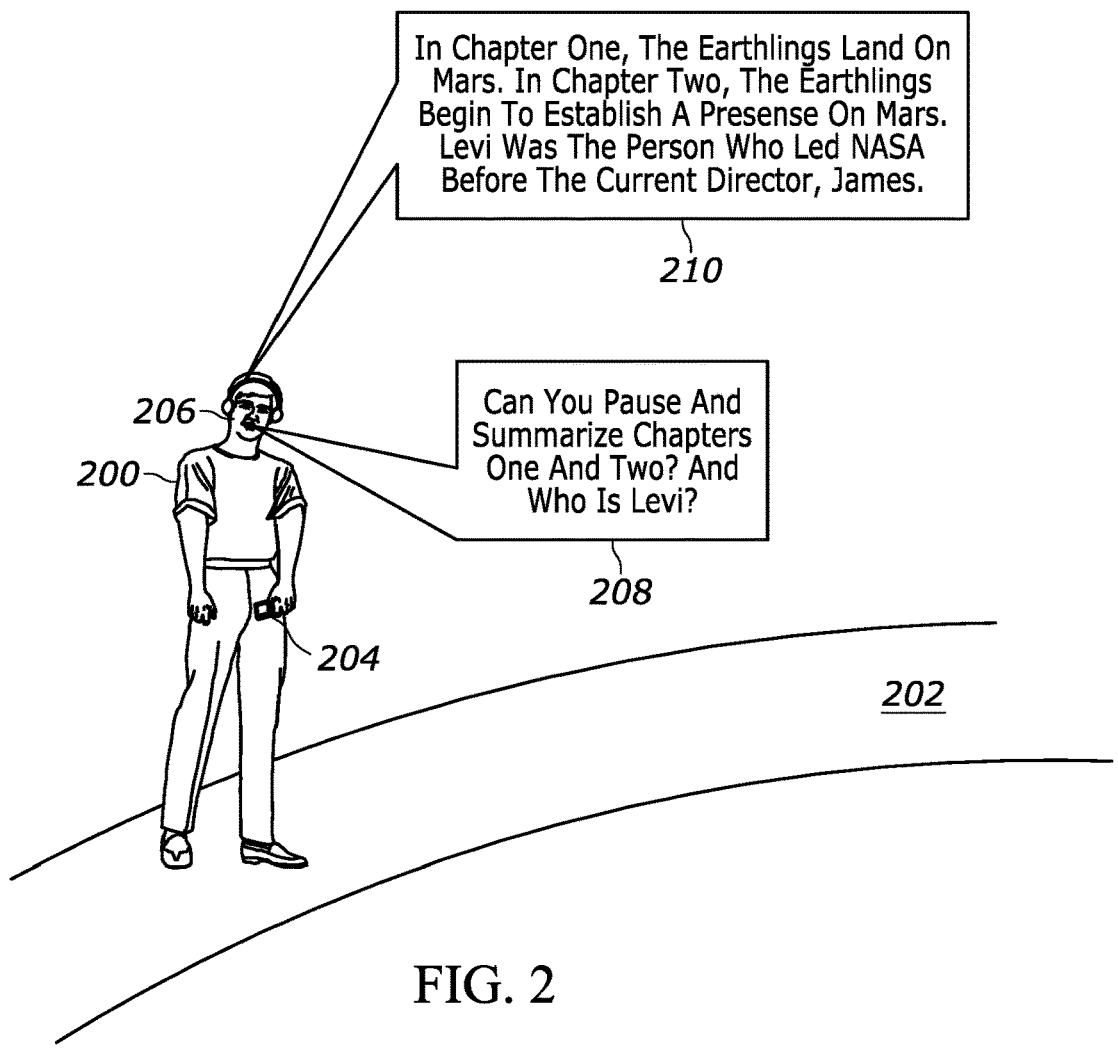
FIG. 2 shows an example illustration of a user listening to an audio book and submitting a request for an output regarding one or more aspects of the audio book consistent with present principles.

Now in reference to FIG. 2, suppose an end-user 200 is hiking along a hiking trail 202 while listening to an indexed audio book or other type of audio file (e.g., indexed podcast or other recording of one or more people speaking). In the present example, the audio book is a fictional sci-fi novel called "Life on Mars", which is directed to future human colonization of Mars. The audio book may be stored locally on a wearable device 204 borne by the user 200, which in the present example is a smart watch. Additionally or alternatively, the book may be accessed by the device 204 over the Internet if, for example, the audio book is stored at a cloud-based Internet server. Once accessed, the device 204 may use Bluetooth or other wireless communication technology to stream audio of the book (including audible narration and quotes from the book's characters, for example) to ear bud headphones 206 in the ears of the user 200 so that the user 200 can hear the audio book.

Also suppose per FIG. 2 that the end-user 200 provides audible input as detected by a microphone on one or more of the devices 204, 206, and that the devices 204 and/or 206 process the audible input using a voice assistant application ("app") executing at one or both devices. In various examples, the voice assistant app may be a digital assistant configured with voice processing/natural language understanding functionality and, as such, may be similar to Amazon's Alexa, Google's Assistant, or Apple's Siri. Although not shown in FIG. 2, note that the assistant may be woken up with a keyword, such as "Audible", "Rakuten" or "Libby". However, since it may be assumed that the audiobook application is playing, the digital assistant may already be awake and can respond to commands. It is envisioned that the digital assistant would be able to respond to queries regarding plot from the beginning, from the last action scene, or just the current scene. And these can be in the form of summaries that might be organized chapter by chapter or simply a linear recitation of events. In addition, a user may ask questions about any object, technology, characters as well as any groups, organizations and locations cited. The digital assistant may be able to detect that the user is talking and automatically pause playback. Alternatively, an explicit command can be given. The command can be given using natural language. This can all be done without being a spoiler. For example, if a character is shown to be a spy in a subsequent chapter of an espionage thriller, the description up the current playback point would omit that detail. One or both of the devices 204, 206 may then process the audible input to identify a pause command (e.g., "Can you pause" as shown via the speech bubble 208) and to identify ensuing voice input requesting a summary and/or other information (e.g., "Summarize chapters one and two. And who is Levi?"). Responsive to receipt of the pause command, the device(s) may pause audible presentation of the audio book at its current playback position and subsequently provide an audible response through the speakers in the headphones 206. The audible response may be dynamically determined by the devices 204/206 and/or a cloud server in communication with those devices as set forth herein. Thus, in the present example speech bubble 210 indicates that the audible response is "In chapter one, the earthlings land on Mars using a nuclear-powered spaceship that took only 45 days from earth. In chapter two, the earthlings begin to establish a colony presence on Mars. Levi was the person who led NASA before the current director, James."

Responsive to providing the audible response, the device may autonomously begin presenting the audio of the audio book again from the current playback position at which the book was paused (e.g. without receiving an unpause or play command from the user 200). Or in other examples, responsive to providing the audible response the device may wait a threshold amount of time such as ten seconds to see if the user 200 asks additional questions/requests, and then responsive to expiration of the threshold amount of time without additional questions/requests being received the device may resume playback of the audio book from the current playback position. Or as yet another example by itself or as combined with the ones above, the device may auto-resume playback after the audible response responsive to receipt of an audible command or other type of command to resume playback (e.g., an audible "unpause" or "play" command).

Figure 3:
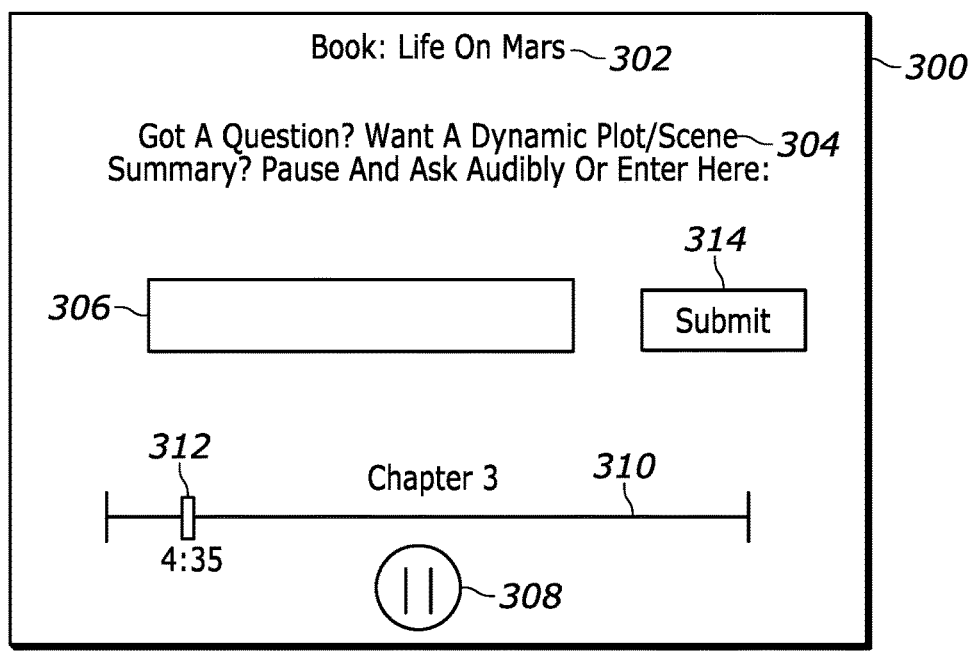
FIG. 3 shows an example graphical user interface (GUI) that may be used to submit a request for an output pertaining to one or more aspects of an audio book consistent with present principles.

FIG. 3 shows additional example aspects consistent with present principles. Specifically, FIG. 3 shows an example graphical user interface (GUI) 300 that may be presented on a display of a device operating consistent with present principles. For example, the GUI 300 may be presented on the display of the wearable device 204 while the user 200 hikes along the hiking path 202.

As shown in FIG. 3, the GUI 300 may include an indicator 302 of the title of the audio book being played out, which again is "Life on Mars". The GUI 300 may also include a prompt 304, which in this example indicates "Got a question? Want a dynamic plot/scene summary? Pause and ask audibly or enter here:", with "enter here" referencing a text entry field/box 306 at which the user may enter text using a hard or soft keyboard or vice input to ask a question or otherwise request information. Thus, the user 200 may pause presentation of the audio book by providing an audible "pause" command as described above and/or by selecting the pause selector 308 presented as part of the GUI 300 (or not shown, in some implementation by simply speaking). This in turn may cause playback to stop at its current position, as indicated by the playback timeline 310 for the current chapter that is being played out (Chapter Three here). In the present example, the current playback position is four minutes, thirty five seconds into the track for Chapter Three, as indicated by the slider 312 that progresses along the playback time 310 as the audio of Chapter Three is played out in real time to indicate the current playback position. Thus, after providing a pause command one way or another, the user may enter text into text input box (or speak the request audibly) and then select the submit selector 314 to submit the question/request to the device for processing.

Figure 4:
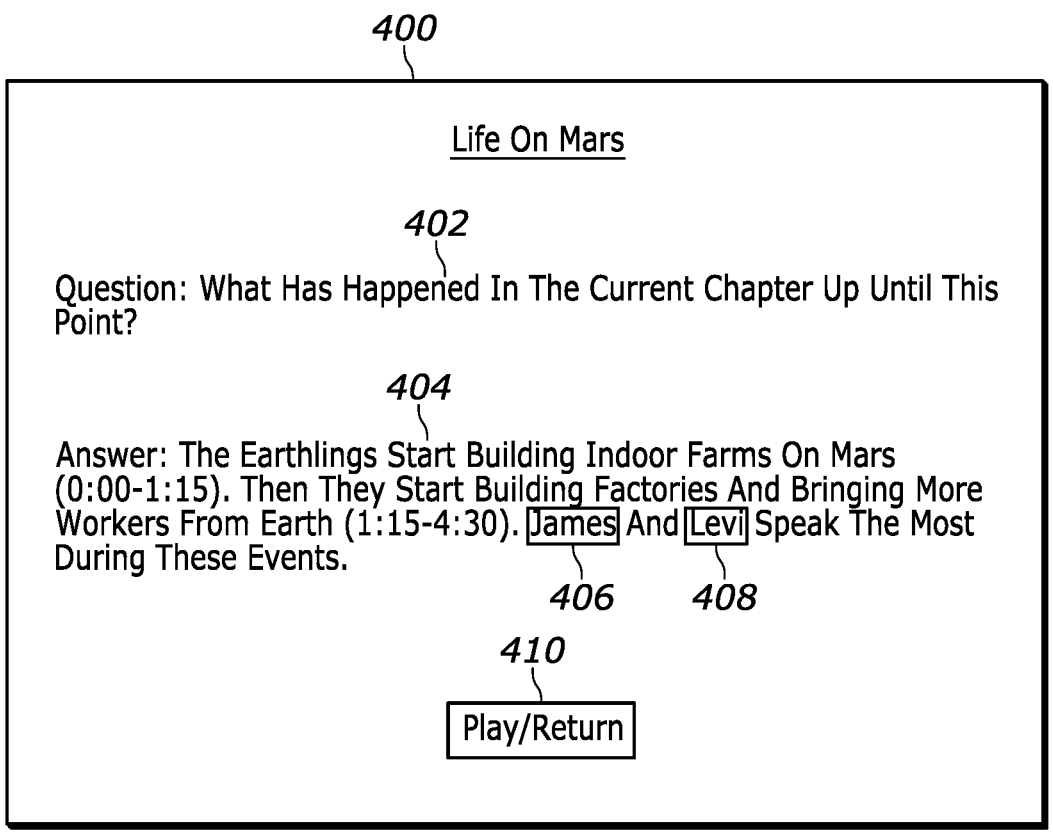
FIG. 4 shows an example GUI presenting an example output pertaining to one or more aspects of an audio book consistent with present principles.

The GUI 400 of FIG. 4 shows an example output that may then be provided by the device in response. As shown, the GUI 400 may first present an indication 402 of the question itself as provided by the user, which in the present example is "What has happened in the current chapter up until this point?" As also shown in FIG. 4, the GUI 400 may include dynamically-generated text 404 indicating an answer to the user's question, with it being further understood that the dynamically-generated text 404 may also be read aloud to the user via one or more speakers (e.g., speakers on the headphones 206). For example, the text 404 may be read aloud using a text-to-speech algorithm to present the text audibly using a computer-generated voice. It should be understood that the creators of the audio book may wish to use the same narrator for the responses as for the narration of the book itself. In which case audio clips would be recorded for each response, and the audio clips would be played out. Alternatively, the computer-generated voice could be made to sound like the human narrator.

As for the text 404 itself, in the present example the text indicates "Answer: The earthlings start building indoor farms on Mars (0:00-1:15). Then they start building factories and bringing more workers from Earth (1:15-4:30). James and Levi speak the most during these events." As may be appreciated from the foregoing, different aspects of this plot summary for Chapter Three may be indexed with metadata for different playout time ranges respectively corresponding to each of those aspects, as may be already configured and stored in storage accessible to the client device of the user (e.g., the wearable device 204).

So, for example, a metadata engineer, system administrator, or audio book publisher might associate, in metadata for the audio book, different plot summary elements of an overall plot summary for the audio book with different playback position ranges for what portions of the audio itself are associated with those respective elements of the plot summary. Then during execution of whatever media player app is being used to present the audio book and based on the user's request, the device/media player app may determine the current playback position as tracked by the device/app itself and then execute natural language processing (e.g., topic segmentation and natural language understanding) to determine the specific type of information being requested. The device/app may then lookup the requested information by accessing and parsing the prestored metadata to dynamically generate a conforming summary that summarizes one or more events up to the current playback position but not events associated with playback positions subsequent to the current playback position. These technical procedures may therefore provide a cognitive aid to the user without spoiling or otherwise revealing other content of the book from latter portions that are juxtaposed after the current playback position. And note that although plot summary has been discussed above, biographies for the characters/individuals in the book as well as glossary terms/descriptions for inanimate objects in the book may also have different portions thereof tagged with metadata of respective playback position ranges to which the respective portions of the biographies/glossary terms pertain so that the device may also autonomously and dynamically provide conforming outputs when questions or requests from the user invoke those elements of the audio book.

Still in reference to FIG. 4, note further that certain words from the dynamically-generated summary 404 may be listed on the face of respective selectors 406, 408. The selectors 406, 408 may be selectable using voice input, touch input, cursor input, etc. to, in response to selection, provide additional outputs regarding the subject of the associated text itself. In the present example and using the same techniques described above, the selector 406 for the book's character James may be selected to output bibliographic and event data regarding James so that only bibliographic and event data about James that has been associated with playback time ranges up until the current playback position may be output. This information may be output audibly and/or output visually through another GUI like the GUI 400. The bibliographic data may include background and other information about James as stated in the audio book itself, and the event data may include events from the audio book up until the current playback position in which James has participated.

As also shown in FIG. 4, selector 408 may be selected to command the device to output similar bibliographic and event data about a different character from the audio book (Levi) that is mentioned in the dynamically-generated summary 404. Further note that an inanimate object in a dynamically-generated summary that is output to the user may also be referenced via an associated selector for that object. In response to selection of such a selector, the device may then similarly provide an object description and event data about that inanimate object. For example, the inanimate object may be a spaceship named "Marslink 2", and selection of a "Marslink 2" selector from a summary like the summary 404 may command the device to present an output describing Marslink 2 as a NASA spaceship made on earth that traveled to Mars as part of the plot of the audio book. And further note here that these types of character and inanimate object outputs may be provided not just based on selection of a selector from a GUI but also based on a separate audible request for such outputs consistent with present principles.

Further note according to FIG. 4 that when the user is ready to resume playback of the audio book from the current playback position, as might occur in embodiments where playback was paused while the summary 404 was generated and output, the user may select the play/return selector 410 to command the device to resume playback.

Figure 5:
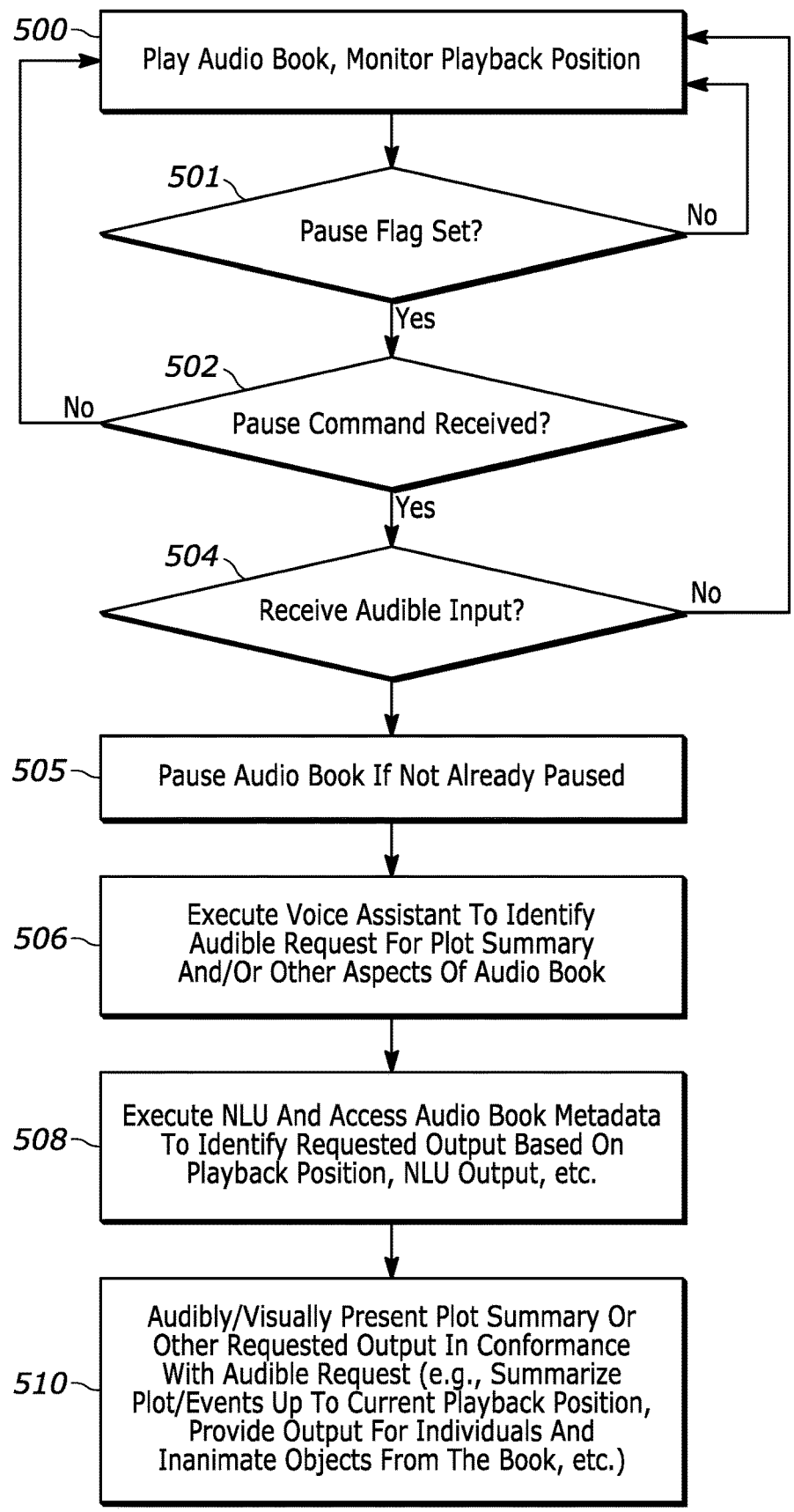
FIG. 5 illustrates example logic in example flow chart format consistent with present principles.

Now in reference to FIG. 5, example logic is shown that may be executed by a device such as the system 10, wearable device 204, server 52, etc. in any appropriate combination consistent with present principles. Note that while the logic of FIG. 5 is shown in flow chart format, other suitable logic may also be used.

Beginning at block 500, the device may play out an audio book (or other type of audio file) through one or more speakers. At block 500 the device may also monitor/track the current playback position of the audio book. The logic may then proceed to decision diamond 501 where the device may check the status of the 604 flag to determine whether a pause flag has been set (e.g., "Don't Respond unless pause command is received first"). If a negative determination is made at diamond 501, the logic may proceed to decision diamond 504 as will be described shortly. However, responsive to an affirmative determination at diamond 501, the logic may first proceed to decision diamond 502.

At decision diamond 502 the device may in some examples determine whether a pause command has in fact been received. In these examples, a negative determination at diamond 502 may cause the logic to revert back to block 500 and proceed therefrom. However, responsive to an affirmative determination at diamond 502 (e.g., an audible command to pause audible presentation of the audio book has been identified based on input from a microphone), the logic may proceed to diamond 504.

Before describing diamond 504 in detail, note here that in certain non-limiting example implementations a pause command may be required before processing an ensuing audible request in order to reduce false positives that might otherwise occur should the user, absent a pause command, ask a rhetorical question like "What is happening?" or "How did we get here?" So in these examples, based on identification of the pause command, the device may process a subsequent audible request that is received within a threshold amount of time of the pause request itself (e.g., within ten seconds, otherwise a timeout may occur where audible requests are not processed after the threshold amount of time to further reduce false positives). But further note that based on not identifying a pause command in this example implementation, the device may instead decline to process an ensuing audible request (e.g., at least until an audible command to pause audible presentation of the audio book is received).

Now in reference to diamond 504, at this step the device may determine whether there exists and/or actually receive audible input or other input (e.g., text-based input). A negative determination may result in the logic returning to block 500, while an affirmative determination may instead cause the logic to proceed to block 509 to pause the audio book if not already paused and then move on to block 506 for other action.

For example, input from a microphone may be received at diamond 504 to identify, at block 506 based on the input from the microphone, an audible request for a plot summary pertaining to some but not all of the audio book. For example, at block 506 the device may execute a voice assistant and/or other software to identify the request for the plot summary. Note here that the request might additionally or alternatively request output regarding other aspects of the audio book as well, such as bibliographic data regarding a particular character from the audio book and/or a description of an inanimate object from the audio book.

From block 506 the logic may then proceed to block 508. At block 508 the device may access metadata for the audio book and execute natural language understanding (NLU) (and/or other natural language processing (NLP) techniques) to identify the requested output from the metadata using NLU so that the requested output is tailored to the content of the user's request using data tagged as occurring within the audio book at or before the current playback position as described herein. From block 508 the logic may then proceed to block 510. At block 510 the device may audibly and/or visually present the requested plot summary output and/or other requested output in conformance with the request itself. Again note that the request may have been an audible request in non-limiting examples, that the output may summarize the book's plots/events/scenes up to the current playback position, and that the output may also relate to individuals and/or inanimate objects from the audio book.

Figure 6:
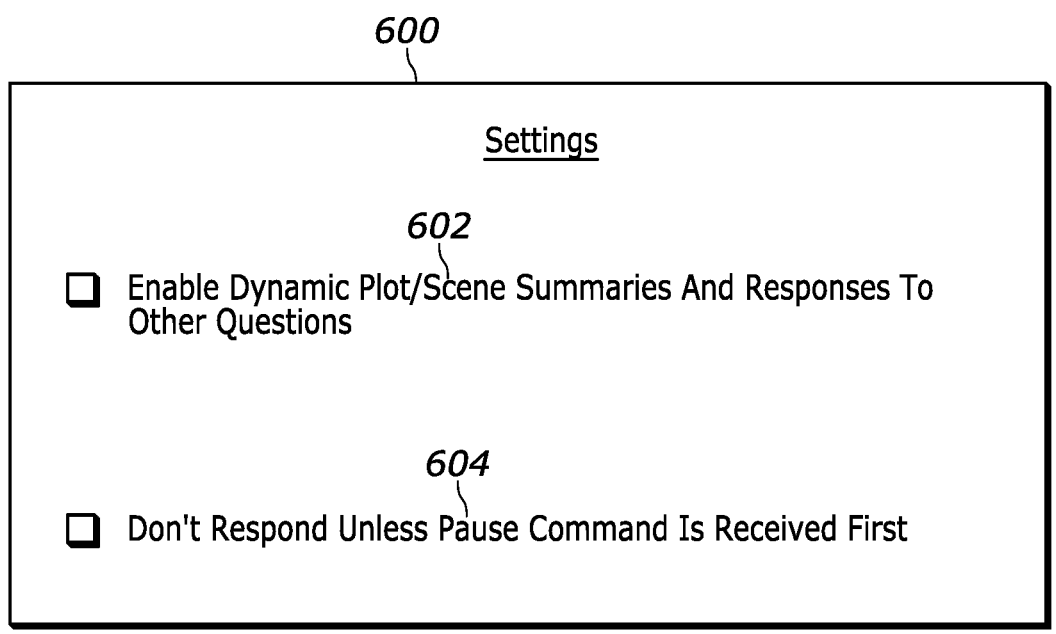
FIG. 6 shows an example settings GUI that can be used to configure one or more settings of a device to operate consistent with present principles.

Continuing the detailed description in reference to FIG. 6, it shows an example settings GUI 600 that may be presented on a display (and/or have its contents audibly read aloud) for an end-user to configure one or more settings of a device to operate consistent with present principles. For example, the GUI 600 may be presented by navigating a device menu or media player app menu at a client device that is being or will be used for audio book playback. In the example shown, each setting may be selected by directing touch, cursor, or other input to the associated check box adjacent to the respective option.

As shown in FIG. 6, the GUI 600 may include a setting 602 that may be selectable a single time to set or enable the device to, in the future, undertake present principles for multiple future instances/playbacks of one or more audio books. For example, selection of the setting 602 may configure the device to execute the logic of FIG. 5, execute the functions described in reference to FIG. 2, and to present the GUIs 300 and 400 of FIGS. 3 and 4.

As also shown in FIG. 6, the GUI 600 may include a second setting 604 that may be selectable to specifically set or enable the device to only respond to audible requests for plot summaries and other audio book outputs if a pause command is received first as described above.

Before concluding, it is to be understood that outputs related to an audio book may include more than just the examples above. For example, in addition to plot/story line summaries, other outputs derived from audio book metadata may be presented upon request including outputs identifying a person that is currently speaking as part of the audio book (e.g., the name of a narrator or simply an output indicating that the narrator is speaking, the name of a particular character from the audio book that is currently speaking, etc.).

It may now be appreciated that present principles provide for an improved computer-based user interface that increases the functionality and ease of use of the devices disclosed herein. The disclosed concepts are rooted in computer technology for computers to carry out their functions.

While the particular embodiments are herein shown and described in detail, it is to be understood that the subject matter which is encompassed by the present invention is limited only by the claims.

What is claimed is:

1. A method, comprising:
   identifying an audible request for information pertaining to some but not all of an audio book;
   responsive to identification of the audible request, accessing data associated with the audio book, the data comprising metadata indicating different plot summary elements of an overall plot summary for the audio book, the different plot summary elements associated with different respective audio book playback position ranges;
   determining a current playback position of the audio book;
   executing naturallanguage processing to determine a type of information being requested pursuant to the audible request;
   using the metadata and the current playback position to identify an answer related to the audible request; and
   based on the identification of the answer, dynamically generating a summary that conforms to the type of information being requested and that summarizes one or more events up to the current playback position but not events associated with playback positions subsequent to the current playback position; and
   presenting a first output on a display, the first output comprising the dynamically-generated summary that conforms to the type of information being requested and that summarizes the one or more events up to the current playback position but not events associated with playback positions subsequent to the current playback position, the first output further comprising a first selector, the first selector comprising a first word from the dynamically-generated summary on the face of the first selector, the first selector being selectable to provide a command to a device to present a second output different from the first output, the second output related to the first word on the face of the first selector;
   wherein the first output further comprises a second selector, the second selector comprising a second word from the dynamically-generated summary on the face of the second selector, the second word being different from the first word, the second selector being selectable to provide a command to the device to present a third output different from the first and second outputs, the third output related to the second word on the face of the second selector:
   wherein the first selector is presented, as part of the first output, in-line with other portions of the dynamically-generated summary, the other portions of the dynamically-generated summary not being selectable to provide commands to present other outputs related to the other portions of the dynamically-generated summary; and
   wherein the second selector is concurrently presented, as part of the first output, in-line with the first selector and with the other portions of the dynamically-generated summary that are not selectable to provide commands to present other outputs related to the other portions of the dynamically-generated summary.

2. The method of claim 1, wherein the presentation step is executed by a media player application ("app") being executed to present the audio book.

3. The method of claim 1, wherein the method comprises: audibly presenting the dynamically-generated summary via a prerecorded audio clip in the voice of a narrator.

4. The method of claim 1, wherein the method comprises:
using a computer generated-voice to audibly present the dynamically-generated summary in the voice of a narrator.

5. The method of claim 1, comprising:
presenting a settings graphical user interface (GUI) on the display, the settings GUI comprising a setting that is selectable a single time to enable presentation of dynamically-generated summaries in conformance with future audible requests.

6. The method of claim 1, wherein the first selector is presented, as part of the first output, in-line on a same line with the other portions of the dynamically-generated summary, the other portions of the dynamically-generated summary not being selectable to provide commands to present other outputs related to the other portions of the dynamically-generated summary.

7. An assembly, comprising:
at least one processor configured with instructions to:
identify a request for information pertaining to some but not all of an audio book;
responsive to identification of the request, access data associated with the audio book, the data comprising metadata indicating different plot summary elements of an overall plot summary for the audio book, the different plot summary elements associated with different respective audio book playback position ranges;
determine a current playback position of the audio book;
execute natural language processing to determine a type of information being requested pursuant to the request;
use the metadata and the current playback position to identify an answer related to the request; and
based on the identification of the answer, dynamically generate a summary that conforms to the type of information being requested and that summarizes one or more events up to the current playback position but not events associated with playback positions subsequent to the current playback position; and
present a first output on a display, the first output comprising the dynamically-generated summary that conforms to the type of information being requested and that summarizes the one or more events up to the current playback position but not events associated with playbackpositions subsequent to the current playback position, the first output further comprising a first selector, the first selector comprising a first word from the dynamically-generated summary on the face of the first selector, the first selector being selectable to provide a command to present a second output different from the first output, the second output related to the first word on the face of the first selector;
wherein the first output further comprises a second selector, the second selector comprising a second word from the dynamically-generated summary on the face of the second selector, the second word being different from the first word, the second selector being selectable to provide a command to present a third output different from the first and second outputs, the third output related to the second word on the face of the second selector;
wherein the first selector is presented, as part of the first output, in-line with other portions of the dynamically-generated summary, the other portions of the dynamically-generated summary not being selectable to provide commands to present other outputs related to the other portions of the dynamically-generated summary; and
wherein the second selector is concurrently presented, as part of the first output, in-line with the first selector and with the other portions of the dynamically-generated summary that are not selectable to provide commands to present other outputs related to the other portions of the dynamically-generated summary.

8. The assembly of claim 7, wherein the instructions are executable to:
present a settings graphical user interface (GUI) on the display, the settings GUI comprising a setting that is selectable a single time to enable presentation of dynamically-generated summaries in conformance with future requests.

9. The assembly of claim 7, comprising the display.

10. The assembly of claim 7, wherein the first selector is presented, as part of the first output, in-line on a same line with the other portions of the dynamically-generated summary, the other portions of the dynamically-generated summary not being selectable to provide commands to present other outputs related to the other portions of the dynamically-generated summary.

11. An apparatus, comprising:
at least one computer storage that is not a transitory signal and that comprises instructions executable by at least one processor to:
identify a request for information pertaining to some but not all of an audio book;
responsive to identification of the request, access data associated with the audio book, the data comprising metadata indicating different plot summary elements of an overall plot summary for the audio book, the different plot summary elements associated with different respective audio book playback position ranges;
determine a current playback position of the audio book;
execute natural language processing to determine a type of information being requested pursuant to the request;
use the metadata and the current playback position to identify an answer related to the request; and
based on the identification of the answer, dynamically generate a summary that conforms to the type of information being requested and that summarizes one or more events up to the current playback position but not events associated with playback positions subsequent to the current playback position; and
present a first output on a display, the first output comprising the dynamically-generated summary that conforms to the type of information being requested and that summarizes the one or more events up to the current playback position but not events associated with playback positions subsequent to the current playback position, the first output further comprising a first selector, the first selector comprising a first word from the dynamically-generated summary on the face of the first selector, the first selector being selectable to provide a command to present a second output different from the first output, the second output related to the first word on the face of the first selector;
wherein the first output further comprises a second selector, the second selector comprising a second word from the dynamically-generated summary on the face of the second selector, the second word being different from the first word, the second selector being selectable to provide a command to present a third output different from the first and second outputs, the third output related to the second word on the face of the second selector;

wherein the first selector is presented, as part of the first output, in-line with other portions of the dynamically-generated summary, the other portions of the dynamically-generated summary not being selectable to provide commands to present other outputs related to the other portions of the dynamically-generated summary; and wherein the second selector is concurrently presented, as part of the first output, in-line with the first selector and with the other portions of the dynamically-generated summary that are not selectable to provide commands to present other outputs related to the other portions of the dynamically-generated summary.

12. The apparatus of claim 11, comprising the at least one processor.

13. The apparatus of claim 11, wherein the instructions are executable to:

present a settings graphical user interface (GUI) on the display, the settings GUI comprising a setting that is selectable a single time to enable the at least one processor to present dynamically-generated summaries in conformance with future user requests for information.

14. The apparatus of claim 11, wherein the first selector is presented, as part of the first output, in-line on a same line with the other portions of the dynamically-generated summary, the other portions of the dynamically-generated summary not being selectable to provide commands to present other outputs related to the other portions of the dynamically-generated summary.

* * * * *